United States Patent
Nishiyama

(10) Patent No.: US 9,177,395 B2
(45) Date of Patent: Nov. 3, 2015

(54) DISPLAY DEVICE AND DISPLAY METHOD FOR PROVIDING IMAGE DISPLAY IN FIRST COLOR MODE AND SECOND COLOR MODE

(71) Applicant: Panasonic Corporation, Osaka (JP)

(72) Inventor: Akio Nishiyama, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 256 days.

(21) Appl. No.: 13/832,369

(22) Filed: Mar. 15, 2013

(65) Prior Publication Data

US 2013/0257896 A1    Oct. 3, 2013

(30) Foreign Application Priority Data

Mar. 28, 2012   (JP) ................... 2012-073214

(51) Int. Cl.
- *G06T 11/00*   (2006.01)
- *G06F 3/0488*  (2013.01)
- *H04N 1/56*    (2006.01)

(52) U.S. Cl.
CPC ............ *G06T 11/001* (2013.01); *G06F 3/0488* (2013.01); *H04N 1/56* (2013.01)

(58) Field of Classification Search
CPC .................................................. G06T 11/001
See application file for complete search history.

(56) References Cited

U.S. PATENT DOCUMENTS

| 2003/0128379 A1* | 7/2003 | Inoue ............................. 358/1.9 |
| 2005/0163369 A1 | 7/2005 | Jyou et al. |
| 2006/0239548 A1* | 10/2006 | George Gallafent et al. . 382/164 |
| 2009/0256947 A1* | 10/2009 | Ciurea et al. ............. 348/333.12 |
| 2011/0317014 A1* | 12/2011 | Onaka ........................... 348/148 |

FOREIGN PATENT DOCUMENTS

| JP | 2001-121669 | 5/2001 |
| JP | 2003-344054 | 12/2003 |
| JP | 2004-118442 | 4/2004 |
| JP | 2007-264862 | 10/2007 |

\* cited by examiner

*Primary Examiner* — Kee M Tung
*Assistant Examiner* — Grace Q Li
(74) *Attorney, Agent, or Firm* — Panasonic Patent Center

(57) ABSTRACT

A display device has a first color mode in which an image is output in monochrome except for a designated color and a second color mode in which colors in an image are output in non monochrome. The display device includes a display unit operable to output a display, and a display controller operable to control the display output on the display unit. While a selecting operation by a user on an image is urged, the display controller displays an image on the display unit in the second color mode, and after completion of the selecting operation by the user, the display controller changes a color mode from the second color mode to the first color mode and then displays an image on the display unit in the first color mode.

12 Claims, 5 Drawing Sheets

*Fig.5A* FULL COLOR
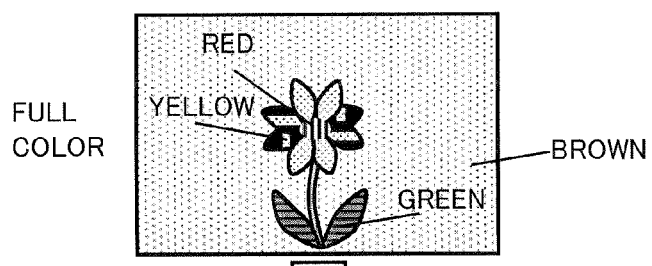
*Fig.5B* ONE POINT COLOR (RED)
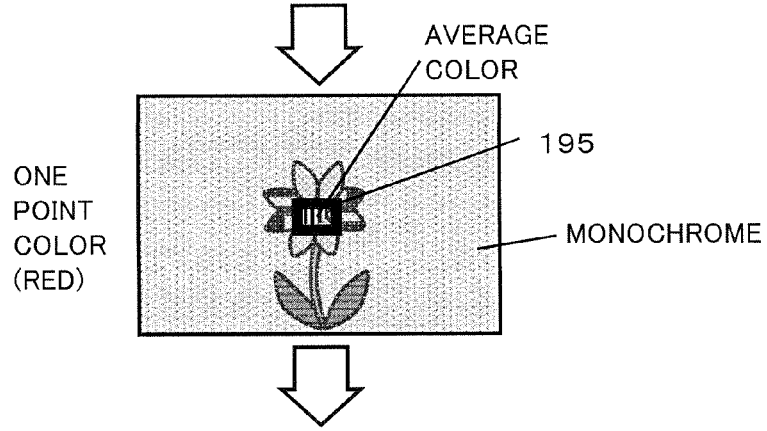
*Fig.5C* FULL COLOR
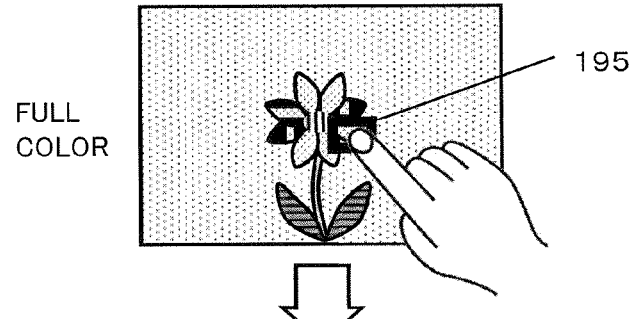
*Fig.5D* FULL COLOR
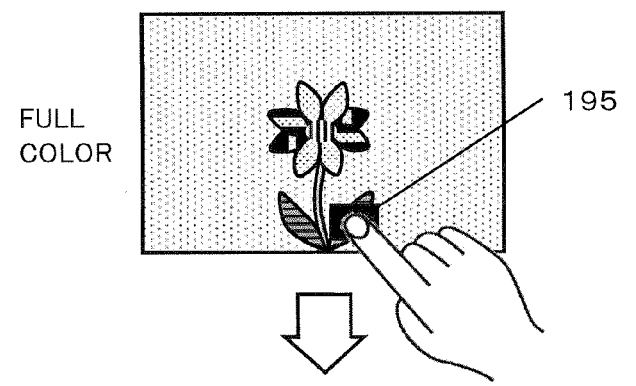
*Fig.5E* ONE POINT COLOR (GREEN)
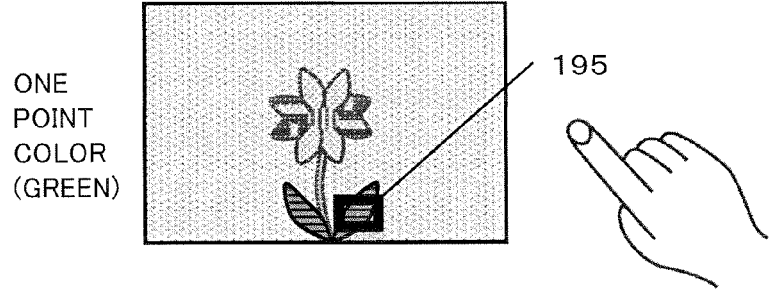

DISPLAY DEVICE AND DISPLAY METHOD FOR PROVIDING IMAGE DISPLAY IN FIRST COLOR MODE AND SECOND COLOR MODE

BACKGROUND

1. Technical Field

The present disclosure relates to a display device. Particularly, the present disclosure relates to a display device which has a display mode which leaves only a specific color in an image and displays other colors in monochrome.

2. Related Art

Technologies which allow a user to designate a color of a specific object displayed on a display unit are known. JP-A-2003-344054 discloses a display device which enables a user to designate a desired color in a color pallet display region to change the color of the specific object.

Recently, display devices having a so-called one point color mode which leaves only a specific color in an image and displays other colors in monochrome is known.

SUMMARY

In the one point color mode, an image is displayed in monochrome except for a specific color. For that reason, once a user sets the color in the one point color mode, the user cannot see the other colors contained in the image, when the user wants to change the specific color, therefore, the user cannot easily designate a desired color.

The present disclosure provides a display device that allows a user to easily designate a desired color in a display mode, such as the one point color mode, that makes only a selected color be displayed in the selected color, but makes other colors be displayed in monochrome.

A display device according to a first aspect has a first color mode in which an image is output in monochrome except for a designated color and a second color mode in which colors in an image are output in non monochrome. The display device includes a display unit operable to output a display, and a display controller operable to control the display output on the display unit. While a selecting operation by a user on an image is urged, the display controller displays an image on the display unit in the second color mode, and after completion of the selecting operation by the user, the display controller changes a color mode from the second color mode to the first color mode and then displays an image on the display unit in the first color mode.

A display device according to a second aspect has a first color mode in which an image is output in monochrome except for a designated color and a second color mode in which colors in an image are output in non monochrome. The display device includes a display unit operable to output a display, and a touch panel provided in the display unit and receives a touch operation by a user, and a display controller operable to control the display output on the display unit. While a touch operation on the touch panel by a user is urged, the display controller displays an image on the display unit in the second color mode, and after completion of the touch operation by the user on the touch panel, the display controller changes a color mode from the second color mode to the first color mode and then displays an image on the display unit in the first color mode with a color designated based on a position of the touch panel that is touched at a completion of the touch operation as the designated color.

According to the present disclosure, a display device that allows a user to more easily designate a desired color in the first color mode can be provided.

BRIEF DESCRIPTION OF DRAWINGS

FIGS. 5A to 5E are diagrams illustrating screens displayed in the one point color mode.

DETAILED DESCRIPTION OF PREFERRED EMBODIMENTS

Embodiments will be described below in detail with reference to the drawings as required. However, unnecessarily detailed description may be omitted. For example, detailed description of already known matters and redundant description of substantially the same configuration may be omitted. All of such omission is for facilitating understanding by those skilled in the art by preventing the following description from becoming unnecessarily redundant.

The inventor (s) provide the attached drawings and the following description for those skilled in the art to fully understand the present disclosure and does not intend to limit the subject described in the claims by the attached drawings and the following description.

First Embodiment

A first embodiment in which the present disclosure is applied to a digital camera will be described. A digital camera according to the first embodiment has a "one point color mode" in which a designated color in an image is output in the designated color and colors other than the designated color are output in monochrome and a "full color mode" in which colors in an image are output in full color. While a user is performing a touch operation on a touch panel with a finger or the like, the digital camera displays an image on a liquid crystal display monitor in the full color mode, and when the user finishes the touch operation on the touch panel with a finger or the like, the digital camera displays the image on the liquid crystal display monitor in the one point color mode in a color contained in an image region corresponding to the touch panel region where the touch operation is finished, as the designated color.

According to of the described digital camera, while user is performing a touch operation on a touch panel, an image is displayed on the liquid crystal display monitor in the full color mode even if a present mode is the one point color mode. That enables the user to easily designate a color that the user desires even if in the one point color mode.

Since the user can designate a color contained in a region touched on the touch panel as a color to be extracted in the one point color mode, the user can intuitively designate a desired color.

A digital camera of the present embodiment will be described below.

1-1. Configuration

Figure 1:
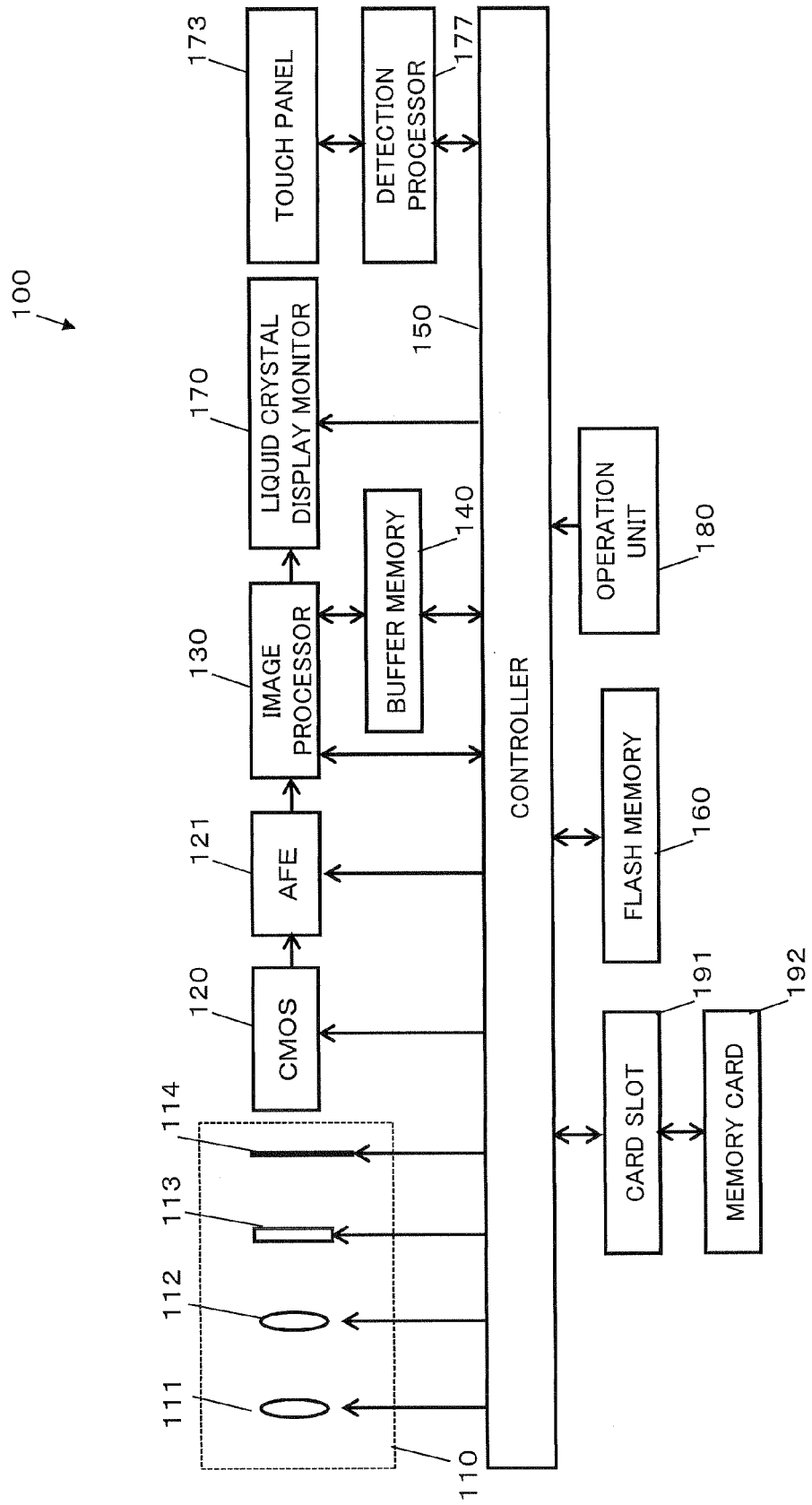
FIG. 1 is a block diagram illustrating a configuration of a digital camera.

FIG. 1 is a block diagram illustrating a configuration of the digital camera. A digital camera 100 has an optical system 110, an AFE 121, an image processor 130, a liquid crystal display monitor 170, a touch panel 173, a detection processor 177, a controller 150, a buffer memory 140, a flash memory 160, and a card slot 191.

The digital camera 100 captures a subject's image formed through the optical system 110 by a CMOS image sensor 120. The CMOS image sensor 120 generates image data based on the captured subject's image. The image data generated by capturing is subject to respective types of processing in the AFE (AFE: Analog Front End) 121 and the image processor 130. The image data is stored in the flash memory 160 or a memory card 192. The image data stored in the flash memory 160 or the memory card 192 is reproduced and displayed on the liquid crystal display monitor 170 when an operation unit 180 receives the user's operation. The image data captured by the CMOS image sensor 120 and then output from the image processor 130 is displayed on the liquid crystal display monitor 170 as a through image.

The optical system 110 includes a focus lens 111, a zoom lens 112, a diaphragm 113, and a shutter 114. Although not shown in the diagram, the optical system 110 may include an Optical Image Stabilizer (OIS). The above respective lenses that are included in the optical system 110 may be configured with one lens or more than one lens, or one group of lenses or more than one group of lenses.

The focus lens 111 is used for adjusting a focal distance, i.e., focus operation. The zoom lens 112 is used for adjusting a scaling magnification. The diaphragm 113 is used for adjusting the light quantity incident on the CMOS image sensor. The shutter 114 adjusts the exposure time of light incident to the CMOS image sensor. The focus lens 111, the zoom lens 112, the diaphragm 113, and the shutter 114 are driven by corresponding driving means (not shown) such as a DC motor and a stepping motor according to control signals notified from a controller 150.

The digital camera 100 captures the subject's image formed through the optical system 110 and generates image data. The CMOS image sensor 120 generates image data of a new frame at a predetermined frame rate (for example, 30 frames/seconds). Timing of generating image data and an electronic shutter operation of the CMOS image sensor 120 are controlled by the controller 150. With the image data successively displayed on the liquid crystal display monitor 170 as the through image, the user can confirm the subject's condition on the liquid crystal display monitor 170 in real time. In the present disclosure, another imaging device such as a CCD image sensor or an NMOS image sensor may be used in place of the CMOS image sensor 120.

The AFE 121 performs processing such as correlated double sampling and gain control on the image data generated by the CMOS image sensor 120. In the gain control, gain corresponding to ISO sensitivity is set. The AFE 121 converts analog image data to digital image data. Then, the AFE 121 outputs the image data to the image processor 130.

The image processor 130 performs various types of processing on the image data. The various types of processing include gamma correction, white balance correction, YC conversion process, electronic zoom process, compression, and expansion. However, the various types of processing may include other types of processing on the image data. The image processor 130 may be configured with a hardwired electronic circuit or may be configured with a microcomputer or the like that executes a program for performing these types of processing. The image processor 130 may also be made into a single integrated circuit together with the controller 150 and the like.

The liquid crystal display monitor 170 is provided on the back of the digital camera 100. The liquid crystal display monitor 170 displays an image based on the image data processed by the image processor 130. The liquid crystal display monitor 170 displays the images such as a through image and a recorded image. The liquid crystal display monitor 170 displays images that are generated for every certain period of time by the CMOS image sensor 120, as the through image in real time. With reference to the through image displayed on the liquid crystal display monitor 170, the user can take a photograph by confirming the composition of the subject. The recorded image is an image recorded on the memory card 192 or the flash memory 160. The liquid crystal display monitor 170 displays an image based on the recorded image data according to a user's operation. Besides, the liquid crystal display monitor 170 can display various setting conditions and the like of the digital camera 100.

The touch panel 173 is provided on the surface of the liquid crystal display monitor 170 and outputs information on the electrode position on the touch panel 173 touched by the user.

The detection processor 177 calculates the position coordinates on the touch panel 173 touched by the user based on the information on the electrode position output by the touch panel 173, and sends it to the controller 150. As a result, the controller 150 can recognize the position on the touch panel 173 touched by the user.

The controller 150 performs integrated control over the operations of the entire digital camera 100. The controller 150 notifies control signals to the CMOS image sensor 120, the image processor 130 and the like based on a vertical synchronizing signal (VD). The controller 150 is configured with a ROM (not shown) that stores information on a program and the like, a CPU (not shown) that processes the information on the program, and the like. The ROM stores programs related to autofocus control and auto-exposure control as well as programs for performing integrated control over the operations of the entire digital camera 100.

The controller 150 displays a menu on the liquid crystal display monitor 170, allows the user to perform various kinds of setting by operating the operation unit 180 or the touch panel 173 with reference to the menu, and obtains the setting. In particular, the controller 150 recognizes the position in the photographing frame displayed on the liquid crystal display monitor 170 touched by the user from the position coordinates values output by the detection processor 177, and performs processing according to the user's operation.

The controller 150 may be made of a hardwired electronic circuit, or may be made of a microcomputer or the like. The controller 150 may also be made into a single integrated circuit together with the image processor 130 and the like. The ROM needs not to be provided inside the controller 150 and may be provided outside the controller 150.

The buffer memory 140 is a storage unit that functions as a work memory for the image processor 130 and the controller 150. The buffer memory 140 can be implemented by a DRAM (Dynamic Random Access Memory) or the like.

The flash memory 160 functions as an internal memory for storing image data and the like. The controller 150 stores the image data to be processed in the image processor 130 on the flash memory 160 or the memory card 192.

The card slot 191 is a connection unit that allows the memory card 192 to be attached and detached. The card slot 191 allows the memory card 192 to be electrically and mechanically connected. The card slot 191 may also be provided with a function for controlling the memory card 192.

The memory card 192 is an external memory provided with a storage unit such as a flash memory therein. The memory card 192 can store data such as the image data to be processed in the image processor 130. Although the memory card 192 is shown as an example of external memory in the present embodiment, the external memory may be a storage medium such as an optical disk, an HDD or the like.

Figure 2:
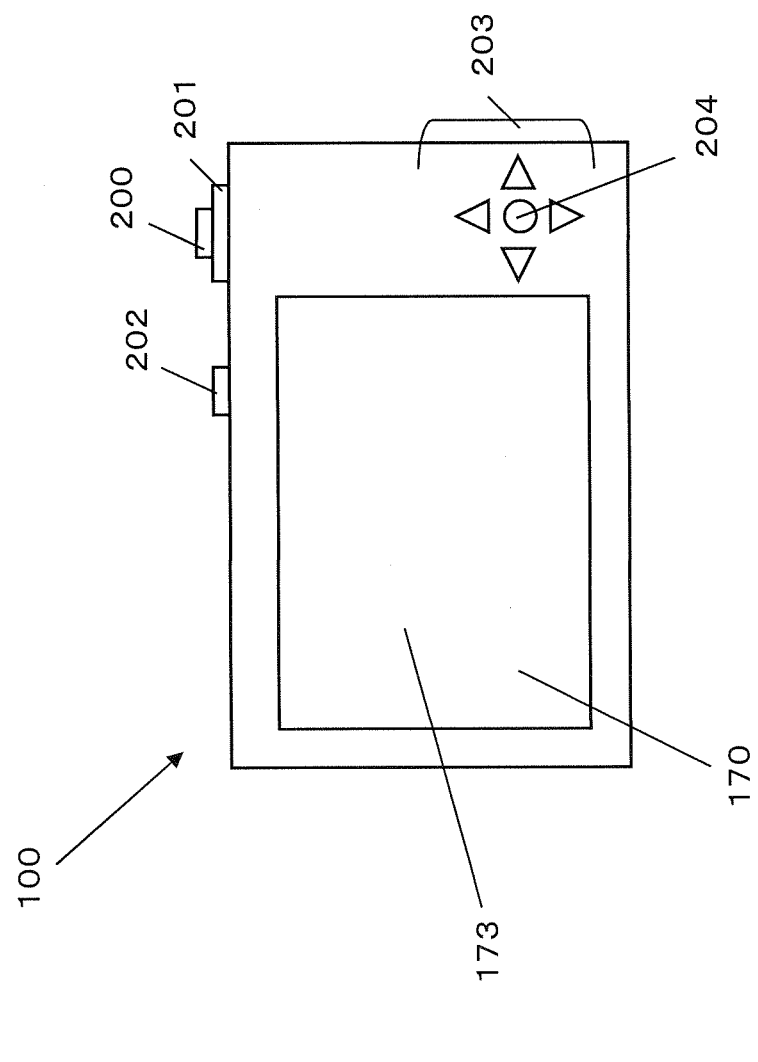
FIG. 2 is a rear view of the digital camera.

The operation unit 180 is a collective name of a button, a lever, a dial and the like provided on the exterior of the digital camera 100, and receives user's operations. For example, as shown in FIG. 2, a release button 200, a zoom lever 201, selection buttons 203, a determination button 204, a power supply button 202 and the like are the operation unit 180. When the operation unit 180 receives a user's operation, it notifies the controller 150 of instructing signals corresponding to the respective operation.

The release button 200 is a two-stage pushbutton. When the release button 200 is half-pressed by the user, the controller 150 performs the auto focus control, the auto exposure control and the like. When the release button 200 is full-pressed by the user, the controller 150 records the image data captured at the time of the full-press operation into the memory card 192 or the like.

The zoom lever 201 is a lever for adjusting the angle of view between the wide-angle end and telephoto end of the angle of view. The zoom lever 201 is a lever that automatically returns to a center position. When the zoom lever 201 is operated by the user, it notifies an operation instructing signal to the controller 150 to drive the zoom lens 112.

The power supply button 202 is a button for switching ON/OFF the power supply for the components of the digital camera 100. The power supply button 202 is a push button. When the power supply button 202 is pressed by the user in the power OFF state, the controller 150 supplies power to components of the digital camera 100 to activate them. When the power supply button 202 is pressed by the user in the power ON state, the controller 150 stops supplying power to the components.

The selection buttons 203 are buttons for selecting a function. The selection buttons 203 are push buttons. The selection buttons 203 are composed of four buttons placed above, below, to the left, and to the right of the determination button 204. By pressing one of the selection buttons 203, the user can select one of the various conditional items displayed on the liquid crystal display monitor 170.

The determination button 204 is a button for determining the selected function. The determination button 204 is a push button. When the determination button 204 is pressed by the user while the digital camera 100 is in the photographing mode or the reproducing mode, the controller 150 displays a menu screen on the liquid crystal display monitor 170. The menu screen is for the user to set various conditions for the photography operation/reproducing operation. When the various conditional setting items are selected and the determination button 204 is pressed, the controller 150 determines the selected items' settings.

1-2. Operation

The operation of the digital camera 100 of the first embodiment will be described below.

Figure 3:
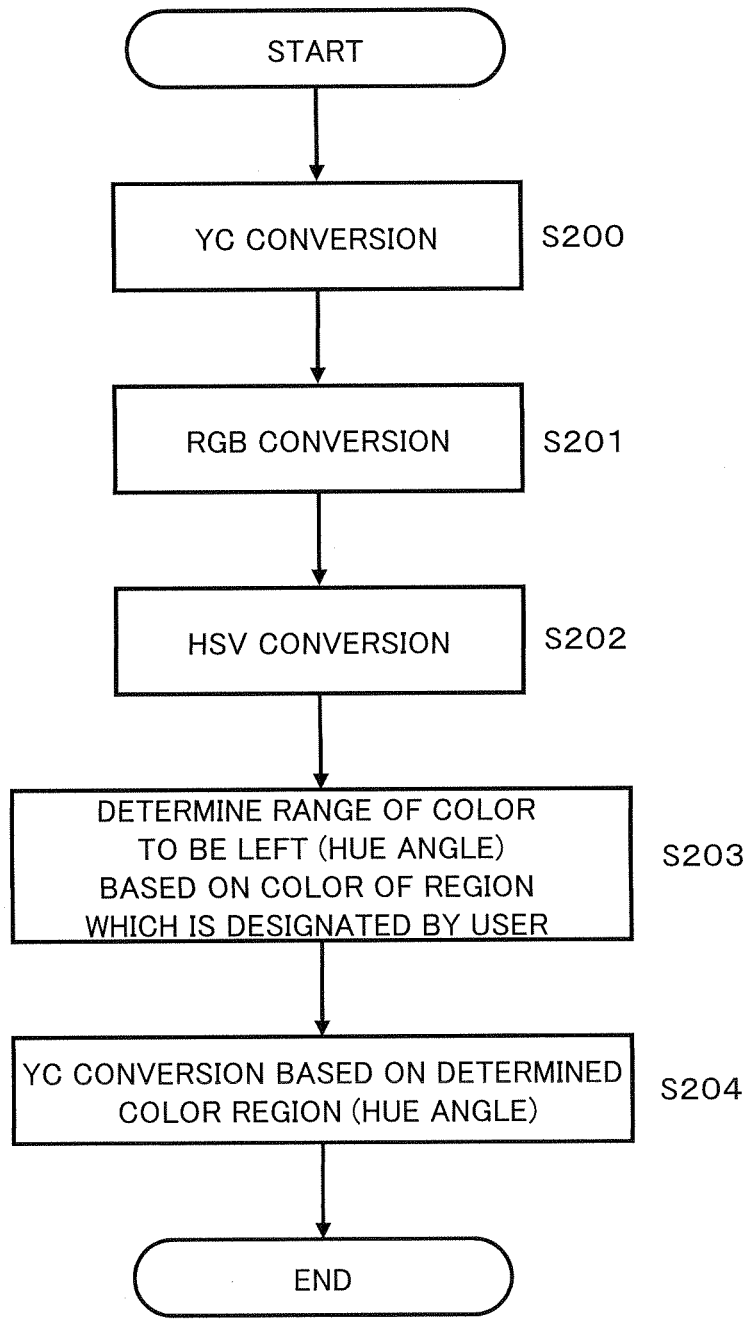
FIG. 3 is a flow chart of a one point color extraction processing.

First, an outline of the one point color determination processing (extraction processing) will be described with reference to FIG. 3. FIG. 3 is a flow chart of the one point color determination processing.

The image processor 130 obtains an image data (RAW data) output from the CMOS image sensor 120 and processed in the AFE 121. The image processor 130 performs YC conversion process on the obtained image data (RAW data) to generate YC data (S200). Next, the image processor 130 converts the YC data into RGB data in an RGB color space (S201). Subsequently, the image processor 130 converts the RGB data into HSV data in an HSV color space (S202). The HSV data is data that represents an image by three indices of Hue, Saturation, and Value.

Next, the controller 150 determines a color range (hue angle) to be left in displaying the image in the one point color mode (hereinafter, referred to as "one point color") based on the color of an object contained in a region that is designated by the user with a finger touching the touch panel 173 (S203). Specifically, in the digital camera 100 of the present embodiment, the color range (hue angle) of the one point color is determined as follows.

First, the color to be extracted as the one point color is determined based on the average of a predetermined index among the HSV data output from the pixels within a rectangular region of 8 pixels×8 pixels around the position on the touch panel 173 touched by the user. Specifically, the color to be extracted as the one point color is determined based on the average of Hue components among the HSV data. For example, when the average of Hue components among the HSV data of the pixels contained in the region on the touch panel 173 designated by the user indicates "green", the controller 150 determines green as the color to be extracted as the one point color. Here, in the HSV color space, Hue is represented by the hue angle that may have the value ranging from 0 degrees to 360 degrees. Each color may be represented by the hue angle such that the hue angle of "green" is 120 degrees. When the Hue component designated by the user is, for example, "green" of the hue angle 120 degrees, the controller 150 determines a predetermined range of angle with the hue angle 120 degrees at the center to be the color range for the one point color to display the image in the one point color mode. The predetermined range of angle may be previously set in the digital camera 100 or may be optionally designated by the user.

Next, the image processor 130 generates the YC data by performing the YC conversion process on the HSV data based on the determined color range for the one point color to display the image in the one point color mode (S204). As a result, the controller 150 can display the one point color image based on the YC data generated in step S204 on the liquid crystal display monitor 170 as a through image. Also, the image processor 130 can generate image data by performing compression processing on the YC data generated in step S204 according to a method conforming to the JPEG compression scheme or the like. Then, the controller 150 can record the image data generated by the image processor 130 performing the compression processing into the memory card 192 as an image file.

Although the case where the one point color is set based on the Hue components of the HSV data is described above, the one point color may be set with other method. For example, threshold values may be set to the indices of Saturation and Value among the indices composing the HSV data so that when each of the values for pixels within the region designated by the user is not more than the predetermined threshold value, the controller 150 determines that the designated color is an achromatic color. In that case, the image processor 130 may process to cause all colors to be displayed in monochrome by setting the range of the hue angle to 0. On the other hand, since the suitable range of the hue angle differs for each color, the controller 150 may change the range of the hue angle according to the designated color.

Figure 4:
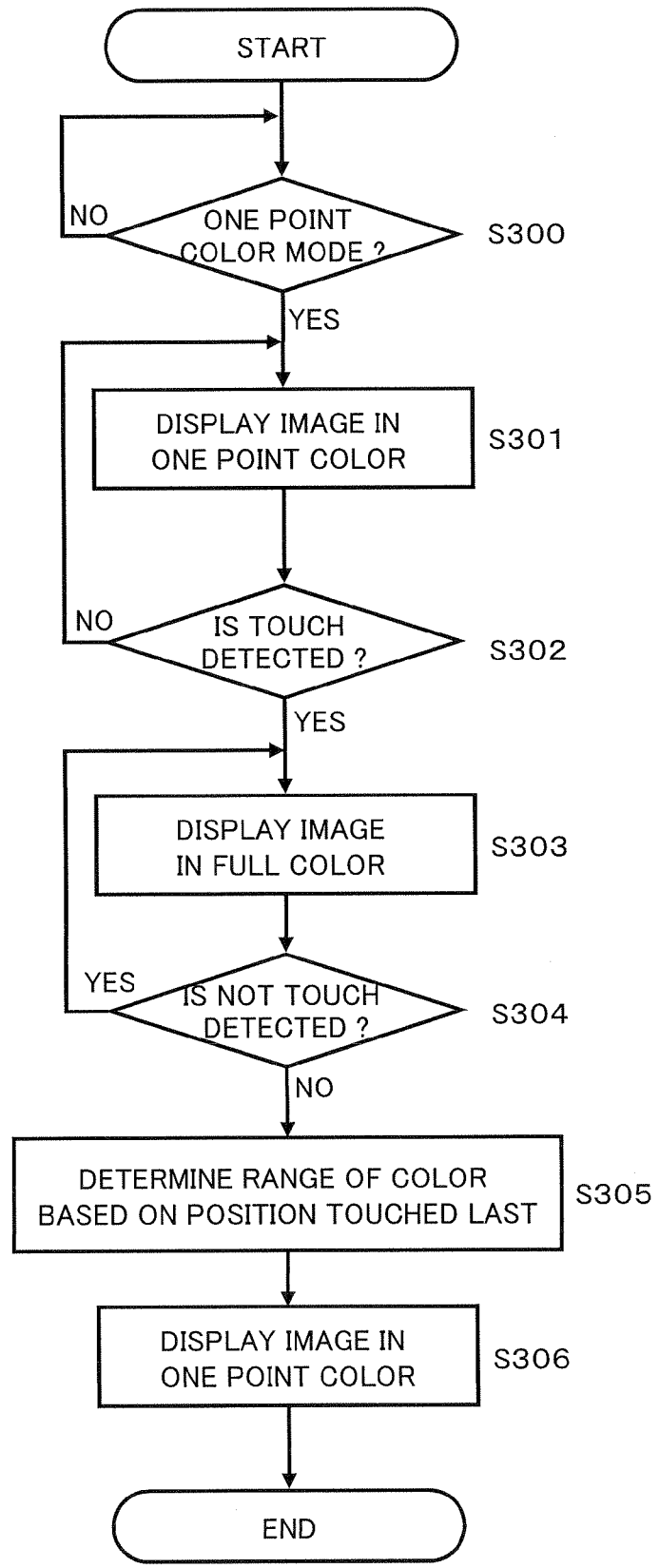
FIG. 4 is a flow chart of an operation in a one point color mode.

Next, a screen displaying operation in the one point color mode will be described with reference to FIG. 4 and FIGS. 5A to 5E. FIG. 4 is a flow chart describing the screen displaying operation in the one point color mode. FIGS. 5A to 5E are diagrams illustrating a series of screens displayed in the one point color mode. The processing described in the flow chart of FIG. 4 and the processing described in the flow chart of FIG. 3 are performed concurrently, so that the color range for the one point color determined by the processing described in the flow chart of FIG. 3 is used in displaying a screen with the one point color in the flow chart of FIG. 4.

First, the controller 150 checks whether the present mode is the one point color mode (S300). When the present mode is not the one point color mode, the controller 150 keeps displaying a standard full color screen (FIG. 5A) on the liquid crystal display monitor 170. FIG. 5A is a diagram illustrating a screen of a subject "flower" with flower petals in "yellow", stamens and a pistil in "red", leaves in "green", and the background in "brown" displayed on the liquid crystal display monitor 170 in the full color mode. That allows the user to adjust the shooting angle and the like while viewing the full color image.

On the other hand, when the present mode is the one point color mode, the controller 150 displays an image that has undergone the one point color processing with the average color within the cursor 195 (S301) (FIG. 5B). The one point color processing is performed as described above in the image processor 130 when the controller 150 notifies the position of the cursor 195. FIG. 5B is a diagram illustrating a screen with the average color ("red" of stamens and a pistil) within the cursor 195 is left and the other colors have undergone the monochrome processing. Although the first screen after entering the one point color mode is illustrated as a screen with the color is displayed as the one point color, the first screen is not limited to that. For example, the first screen after entering the one point color mode may be displayed in full color. Meanwhile, when the first screen is displayed with the one point color, it is easier for the user to recognize that the screen display is set to the one point color mode. On the other hand, when the first screen is displayed with the full color, it is easier for the user to select an optional color.

Next, the controller 150 detects whether the user has performed touch operation on the screen (S302). When the touch operation is detected, the controller 150 displays the screen in full color to allow the user to confirm easily any color (S303) (FIG. 5C). FIG. 5C is a diagram illustrating a screen when the user is touching the flower petal. When the controller 150 detects the touch operation, it changes the drawing position of the cursor 195 to the touch position while displaying a full color screen. That enables the user to easily recognize the range selected by the touch operation.

Subsequently, the controller 150 detects whether the user finishes the touch operation (S304). In the case where the controller 150 does not detect that the touch operation is finished also in the process of dragging, i.e., in the case where the touch operation is no longer detected, it continues with the full color display (FIG. 5D). FIG. 5D is a diagram illustrating a screen when the user has dragged the touch position to the leaf part from the state illustrated in FIG. 5C. Also in that case, when the controller 150 detects the touch operation, it changes the drawing position of the cursor 195 to the currently touched position while continuing with the full color display.

When the user finishes the touch operation, the controller 150 determines the color range (hue angle) of the one point color correspondingly to the position touched last (S305). Specifically, the color range of the one point color is determined based on, for example, colors contained in the region inside the cursor 195. The region inside the cursor 195 is a rectangular region of 8 pixels×8 pixels around the position on the touch panel 173 touched by the user. The region inside the cursor 195 does not need to agree with the range of the rectangular region around the position on the touch panel 173 touched by the user. However, when the range of the rectangular region around the position on the touch panel 173 touched by the user agrees with the region inside the cursor 195, it becomes easier for the user to confirm the desired color.

Pointing of the region on the touch panel 173 to designate the one point color is not limited to pointing of the position by the touch operation, but may be pointing of the position by operating the directional keys. In that case, the screen may be displayed in full color as far as the operation on the directional keys continues, and when the user stops the operation on the directional keys, the color range (hue angle) of the one point color may be determined based on the region corresponding to the position of the cursor 195 where the operation stops.

Finally, the controller 150 performs the one point color processing based on the determined color range and displays the screen (S306) (FIG. 5E). FIG. 5E is a diagram illustrating a screen at the time when the user finished the touch operation on the leaf part, and illustrates an image in which only the "green" of the leaf part where the touch operation finished is left and the other colors have undergone the monochrome processing.

As described above, while the user is performing the operation of selecting a region for setting the one point color, the digital camera 100 displays the image on the liquid crystal display monitor 170 in the full color mode, and when the user finishes the selecting operation, the digital camera 100 displays the image on the liquid crystal display monitor 170 in the one point color mode with the color determined based on the selecting operation as the designated color. That allows the user to easily designate the color to leave while viewing the screen in the full color mode.

1-3. Effects and the Like

The digital camera 100 of the present embodiment has the "one point color mode" in which colors other than the designated color in the image are output in monochrome and the "full color mode" in which colors in the image are output in full color. The digital camera 100 has the liquid crystal display monitor 170, and the controller 150 that controls display on the liquid crystal display monitor 170. While a selecting operation by a user on an image is urged, the controller 150 displays an image on the liquid crystal display monitor 170 in the full color mode, and after completion of the selecting operation by the user, the controller 150 changes a color mode from the full color mode to the one point color mode and then displays an image on the liquid crystal display monitor 170 in the one point color mode.

As a result, while a touch operation on the touch panel 173 by a user is urged, the image is displayed in the full color mode on the liquid crystal display monitor 170, and after completion of the touch operation by the user on the touch panel 173, the image is displayed on the liquid crystal display monitor 170 in the one point color mode. That enables the user to more easily designate a desired color.

In the present embodiment, the selecting operation is an operation to select the designated color.

As a result, when the user performs the selecting operation to select a designated color, the image is displayed on the liquid crystal display monitor 170 in the one point color mode.

Further, the digital camera 100 of the present embodiment has the one point color mode in which colors other than a designated color in an image are output in monochrome and the full color mode in which the colors in the image are output in full color. The digital camera 100 has the liquid crystal display monitor 170, the touch panel 173 that is placed in the liquid crystal display monitor 170 and receives a touch operation by a user, and the controller 150 that controls display on the liquid crystal display monitor 170. While a touch operation on the touch panel 173 by the user is urged, the controller 150 displays an image on the liquid crystal display monitor 170 in the full color mode, and after a completion of the touch operation by the user on the touch panel 173, the controller 150 changes a color mode from the full color mode to the one point color mode and then displays an image on the liquid crystal display monitor 170 in the one point color mode with a color designated based on a position of the touch panel 173 that is touched at the completion of the touch operation as the designated color.

As a result, while a touch operation on the touch panel 173 by a user is urged, the image is displayed on the liquid crystal display monitor 170 in the full color mode, and after a completion of the touch operation by the user on the touch panel 173, the image is displayed on the liquid crystal display monitor 170 in the one point color mode with a color determined based on a region on the touch panel 173 that is touched at the completion of the touch operation as the designated color.

Other Embodiments

As described above, the first embodiment is described as an example of the technology disclosed in the present application. However, the technology in the present disclosure is not limited to that embodiment and may also be applied to other embodiments that are subject to modification, substitution, addition, or omission as required. Also, the respective constituent elements described in the first embodiment may be combined to form a new embodiment.

Then, non-exhaustive examples of some of the other possible embodiments will be exemplified below.

In the above described embodiment, an image is output in monochrome except for a designated color in the one point color mode. However, a color except for a designated color in the one point color mode is not limited to monochrome. For example, a color except for a designated color may be one color such as red, blue or the like.

In the above described embodiment, an image is output in full colors in the full color mode. However, in place of the full color mode, a color mode in which an image is output in colors less than full colors may be provided.

In the above described embodiment, when the touch operation is performed on the screen by the user while the screen is displayed in the one point color mode, the screen is displayed in the full color mode. However, the trigger to change the mode is not limited to that. Other examples will be described below.

First Example

When an operation such as a pinching operation of scaling up or scaling down is performed by the user on an image (object) on the screen, while the screen is displayed in the one point color mode, the screen may be displayed in the full color mode while the operation is performed. Then, when the operation of scaling up or scaling down is finished, the screen may be displayed in the one point color mode with the designated color that is set at the time when the operation of scaling up or scaling down is finished.

Second Example

When a designating (selecting) operation (for example, a designating (selecting) operation of a subject to be focused in the autofocus) is performed by the user touching a target object (subject) on the touch panel 173 while the screen is displayed in the one point color mode, the screen may be displayed in the full color mode while the operation is performed. Then, when the operation of designating the target object is finished, the screen may be displayed in the one point color mode with the designated color that is set at the time when the designating operation is finished.

Third Example

When a designating operation (for example, a dragging operation on the touch panel 173 or a selecting operation by using selection buttons 203) of designating a target object (subject) with a range defined by a rectangular frame or a circular frame with a variable size is performed by the user while the screen is displayed in the one point color mode, the screen may be displayed in the full color mode while the operation is performed. Then, when the operation of designating the target object is finished, the screen may be displayed in the one point color mode with the designated color that is set at the time when the designating operation is finished.

Fourth Example

While the automatic recognition is performed on such an object as the face with the screen is displayed in the one point color mode, the screen may be displayed in the full color mode. Then, when the automatic recognition of the target object is finished, the screen may be displayed in the one point color mode with the designated color that is set at the time when the automatic recognition processing is finished.

Although the case where a predetermined color range that is set to have a certain color be in the center of the range is selected as the one point color is described in the above described embodiment, the same idea as that of the case where a predetermined color range with a certain color in the center is selected can be applied to the case where predetermined color ranges that is set to have certain two colors be in the centers of the respective ranges are selected as the one point color.

In the above described embodiment, although the colors that belongs to a predetermined range of angle, and that is set to have the colors determined by colors contained in the user-designated range be in the center are determined to be left the determination method is not limited to that. For example, a color histogram within a rectangular region around the position touched by the user be in the center may be detected to change the hue angle according to the color distribution state represented by the color histogram. For example, when a color within the rectangular region is only the red color of a flower or the like, the range of color distribution represented by the color histogram becomes small. In this case, the hue angle may be set smaller. When a color in the within the rectangular region is the pale orange of a person's face or the like, the range of color distribution represented by the color histogram becomes big. In this case, the hue angle may be set bigger. As a result, the more suitable hue angle may be set based on the color histogram of a rectangular region around the position touched by the user.

In the above described embodiment, the controller 150 displays the screen on the liquid crystal display monitor 170 in full color while the user is performing the touch operation on the touch panel 173. In contrast, the controller 150 may display a screen on the liquid crystal display monitor 170 with the one point color while the user is performing the touch operation on the touch panel 173. In that case, when the user performs touch and drag operation on the touch panel 173, the controller 150 may change the color range (hue angle) of the one point color correspondingly to the touched position. That is, on this occasion, the liquid crystal display monitor 170 displays a state that the extracted color is changed according to the touch position in real time. That enables the user to easily confirm a preview of the one point color according to the touch position.

The embodiments have been described above as examples of the technology of the present disclosure. For those examples, the attached drawings and the detailed description have been provided. Consequently, in order to exemplify the above described technology, the constituent elements shown in the attached drawings and described in the detailed description may include not only a constituent element that is necessary to solve the problem but also a constituent element that is not necessary to solve the problem. Therefore, the unnecessary constituent element should not be instantly recognized as a necessary constituent element merely because it is shown in the attached drawings and described in the detailed description.

Since the above described embodiments are for exemplifying the technology in the present disclosure, the embodiments may be subject to various kinds of modification, substitution, addition, and omission without departing from the scope of the claims and their equivalents. In addition, the respective constituent elements described in the first embodiment may be combined to make a new embodiment.

INDUSTRIAL APPLICABILITY

The image capture apparatus of the present disclosure is not limited to be applied to the digital camera. That is, the present disclosure can be applied to imaging apparatuses including a movie camera, an information terminal with a camera, and a game console with a camera.

What is claimed is:

1. A display device having a first color mode in which an image is output in monochrome except for a designated color and a second color mode in which colors in the image are output in non monochrome, comprising:
a display unit operable to output a display; and
a display controller operable to control the display output on the display unit, wherein
(i) the display controller displays an image on the display unit in the first color mode before a selecting operation is performed by a user on an image,
(ii) when a selecting operation by a user on an image is started, the display controller changes a color mode from the first color mode to the second color mode and then displays an image on the display unit in the second color mode,
(iii) after the selecting operation by the user is started to a time when the selecting operation by the user is completed, the display controller maintains the second color mode, and
(iv) after completion of the selecting operation by the user, the display controller changes a color mode from the second color mode to the first color mode and then displays the image on the display unit in the first color mode with a color designated based on a position selected at completion of the selecting operation as the designated color, wherein
the image in the second color mode and the image in the first color mode are displayed on a same area as each other in a screen of the display unit,
the selecting operation is an operation moving a cursor which has a predetermined area on the image, and
the display controller sets the designated color based on colors included in the predetermined area of the cursor.

2. The display device according to claim 1, wherein the selecting operation is an operation to select the designated color.

3. The display device according to claim 1, wherein the selecting operation is an operation to select a predetermined object contained in the image,
the designated color is designated based on the selected predetermined object.

4. The display device according to claim 1, wherein the user's selecting operation is an operation to scale up or scale down the image.

5. The display device according to claim 1, wherein a display region of an image displayed in the first color mode is same as a display region of an image displayed in the second color mode.

6. A display device having a first color mode in which an image is output in monochrome except for a designated color and a second color mode in which colors in the image are output in non monochrome, comprising:
a display unit operable to output a display; and
a touch panel provided in the display unit and operable to receive a touch operation by a user; and
a display controller operable to control the display on the display unit, wherein
(i) the display controller displays an image on the display unit in the first color mode before a selecting operation is performed by a user on an image,
(ii) when a touch operation on the touch panel by a user is started, the display controller changes a color mode from the first color mode to the second color mode and then displays the image on the display unit in the second color mode,
(iii) after the touch operation by the user on the touch panel is started to a time when the touch operation by the user on the touch panel is completed, the display controller maintains the second color mode, and
(iv) after completion of the touch operation by the user on the touch panel, the display controller changes a color mode from the second color mode to the first color mode and then displays an image on the display unit in the first color mode with a color designated based on a position of the touch panel that is touched at a completion of the touch operation as the designated color, wherein
the image in the second color mode and the image in the first color mode are displayed on a same area as each other in a screen of the display unit,
the touch operation by the user on the touch panel is an operation moving a predetermined area in the image, and
the display controller sets the designated color based on colors included in the predetermined area.

7. The display device according to claim 6, wherein
while a selecting operation of a predetermined object by touching the touch panel is urged, the display controller displays the image on the display unit in the second color mode and
after completion of the selecting operation, the display controller changes a color mode from the second color mode to the first color mode and then displays the image on the display unit in the first color mode with a designated color designated based on the predetermined object.

8. The display device according to claim 6, wherein
while an operation of scaling up or scaling down the image on the touch panel is detected, the display controller displays the image on the display unit in the second color mode and after completion of the scaling up or scaling down operation is urged, the display controller displays the image on the display unit in the first color mode with the designated color designated at the completion of the scaling up or scaling down operation.

9. The display device according to claim 6, wherein a display region of an image displayed in the first color mode is same as a display region of an image displayed in the second color mode.

10. A display method in a display device having a first color mode in which an image is output in monochrome except for a designated color and a second color mode in which colors in the image are output in non monochrome, including:
  (i) displaying an image on a display unit in the first color mode before a selecting operation is performed by a user on an image,
  (ii) when a selecting operation by a user on an image is started using an input device, changing a color mode from the first color mode to the second color mode and then displaying an image on the display unit in the second color mode using a display controller device,
  (iii) after the selecting operation by the user is started to a time when the selecting operation by the user is completed, maintaining the second color mode, and
  (iv) after completion of the selecting operation by the user, changing a color mode from the second color mode to the first color mode and then displaying the image on the display unit in the first color mode using the display controller device with a color designated based on a position selected at completion of the selecting operation as the designated color, wherein
the image in the second color mode and the image in the first color mode are displayed on a same area as each other in a screen of the display unit,
the selecting operation is an operation moving a cursor which has a predetermined area on the image, and
setting the designated color based on colors included in the predetermined area of the cursor.

11. A non-transitory computer readable medium that stores executable programming instructions that makes a computer execute the display method according to claim 10.

12. The display device according to claim 10, wherein a display region of an image displayed in the first color mode is same as a display region of an image displayed in the second color mode.

* * * * *